(12) United States Patent
Jania et al.

(10) Patent No.: US 9,471,898 B2
(45) Date of Patent: Oct. 18, 2016

(54) ENDORSING E-MAIL MESSAGES USING SOCIAL NETWORK VERIFICATION

(75) Inventors: Frank J. Jania, Chapel Hill, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1467 days.

(21) Appl. No.: 11/967,774

(22) Filed: Dec. 31, 2007

(65) Prior Publication Data

US 2009/0265431 A1 Oct. 22, 2009

(51) Int. Cl.
G06Q 10/10 (2012.01)
H04L 12/58 (2006.01)
G06Q 50/00 (2012.01)

(52) U.S. Cl.
CPC ............ G06Q 10/107 (2013.01); G06Q 50/01 (2013.01); H04L 12/585 (2013.01); H04L 12/588 (2013.01); H04L 51/12 (2013.01); H04L 51/32 (2013.01)

(58) Field of Classification Search
CPC .. G06Q 50/01; G06Q 10/107; H04L 12/585; H04L 12/588; H04L 51/12; H04L 51/32
USPC .......................................... 709/206; 715/822
See application file for complete search history.

(56) References Cited

U.S. PATENT DOCUMENTS

| | | | |
|---|---|---|---|
| 6,337,699 B1* | 1/2002 | Nielsen ......................... | 715/837 |
| 6,453,327 B1 | 9/2002 | Nielsen | |
| 6,546,390 B1* | 4/2003 | Pollack et al. ......... | 707/999.007 |
| 7,613,695 B1* | 11/2009 | Solomon et al. ...... | 707/999.005 |
| 2004/0088325 A1* | 5/2004 | Elder et al. ................ | 707/104.1 |
| 2005/0021637 A1 | 1/2005 | Cox | |
| 2005/0076089 A1 | 4/2005 | Fonseca | |
| 2005/0144571 A1* | 6/2005 | Loverin et al. ............... | 715/822 |
| 2005/0246420 A1* | 11/2005 | Little, II ....................... | 709/204 |
| 2006/0010217 A1* | 1/2006 | Sood ............................. | 709/206 |
| 2006/0075350 A1* | 4/2006 | Uemura et al. ............... | 715/752 |
| 2006/0085373 A1* | 4/2006 | Dhillion et al. .................. | 707/1 |
| 2006/0190545 A1 | 8/2006 | Banerjee et al. | |
| 2006/0200432 A1* | 9/2006 | Flinn et al. ...................... | 706/12 |

\* cited by examiner

Primary Examiner — Larry Donaghue
(74) Attorney, Agent, or Firm — Steven M. Greenberg, Esq.; CRGO Law

(57) ABSTRACT

Embodiments of the present invention provide a method, system and computer program product for e-mail message endorsement in an e-mail management system. In an embodiment of the invention, a method for e-mail message endorsement in an e-mail management system can be provided. The method can include comparing a sender and a recipient of an e-mail message in a social network to identify linking relationships between the sender and the recipient, scoring the e-mail message based upon the identified linking relationships, and visually distinguishing the e-mail message based upon the scoring. In one aspect of the embodiment, the method further can include repeating the comparing to identify new linking relationships, updating the scoring based upon the identified new linking relationships, and updating the visual distinction of the e-mail message based upon the updated scoring.

15 Claims, 1 Drawing Sheet

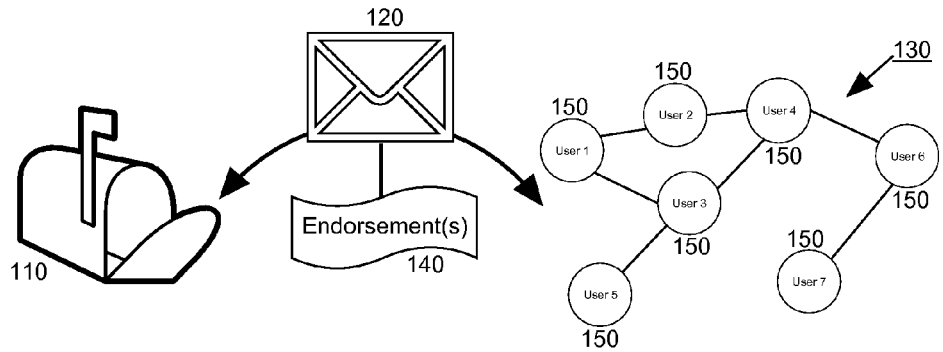
FIG. 1
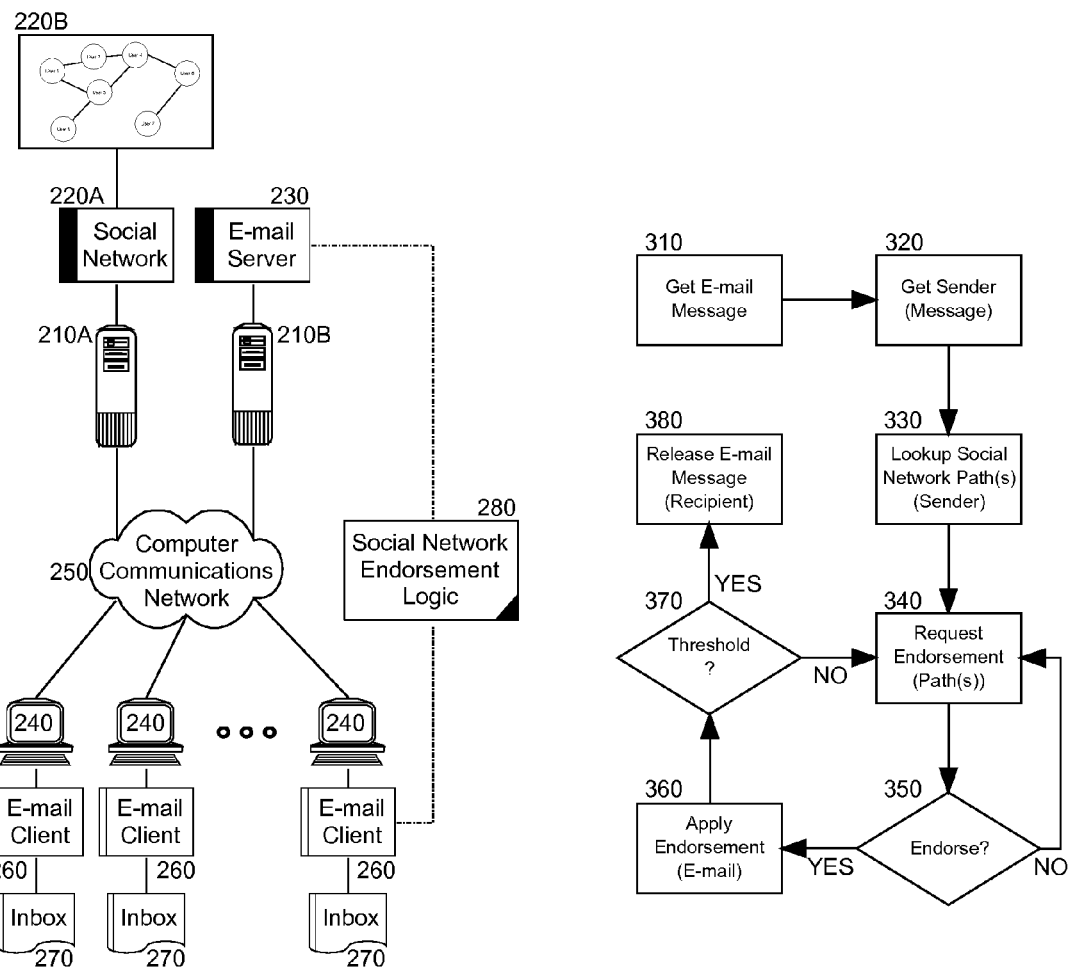
FIG. 2
FIG. 3

ENDORSING E-MAIL MESSAGES USING SOCIAL NETWORK VERIFICATION

BACKGROUND OF THE INVENTION

1. Field of the Invention

The present invention relates to field of e-mail management and more particularly to the field unsolicited commercial e-mail filtering.

2. Description of the Related Art

Historically, the print medium served as the principal mode of unsolicited mass advertising on the part of the direct marketing industry. Typically referred to as "junk mail", unsolicited print marketing materials could be delivered in bulk to a vast selection of recipients, regardless of whether the recipients requested the marketing materials. With an average response rate of one to two percent, junk mail has been an effective tool in the generation of new sales leads. Nevertheless, recipients of junk mail generally find the practice to be annoying. Additionally, postage for sending junk mail can be expensive for significant "mail drops". Consequently, the direct marketing industry constantly seeks equally effective, but less expensive modalities for delivering unsolicited marketing materials.

The advent of electronic mail has provided much needed relief for direct marketers as the delivery of electronic mail to a vast number of targeted recipients requires no postage. Moreover, the delivery of unsolicited electronic mail can be an instantaneous exercise and the unsolicited electronic mail can include embedded hyperlinks to product or service information thus facilitating an enhanced response rate for the "mail drop". Still, as is the case in the realm of print media, unsolicited electronic mail, referred to commonly as "spam", remains an annoyance to consumers worldwide. As a result, an entire cottage industry of "spam filters" has arisen whose task solely is the eradication of spam.

Combating spam in many ways relates to the degree of trust in which an e-mail recipient has in an e-mail sender. For many e-mail users, e-mails are opened only when a sender of an e-mail message is both recognized and trusted. All other e-mails are ignored, automatically routed to a "junk mail" folder, or otherwise filed away without first permitting recipient review. For those who receive only a few e-mails each day, this mental spam filter can be of no consequence. However, for corporate and industrial users receiving dozens if not hundreds of e-mails per day, many important e-mails can go unopened simply because the recipient did not immediately recognize the sender of the unopened e-mail message.

In the context of social networking, establishing trust between communicants has been integral to the social networking fabric from the start. A social network refers to a social structure of nodes each associated with a different person or organization. The interconnections of each node reflect direct relationships between the respective people and organizations such that the directness of a relationship between two persons or organizations associated with respective nodes can be summarized by the path of interconnections between the respective nodes. In this way, any one individual in a social network can evaluate the number and quality of social relationships with others in the network, those relationships ranging from close familial bonds to casual acquaintances.

Many commercial social networking systems require an implicit recognition of trust before permitting two users of the social network to fully interact with one another. Still others suggest trust by expressing to an "invited" user a justification for another user to engage in a social networking link. For instance, in one well known social networking environment, an "invite" to become "friends" with another user can be couched in terms of "you know this person through [blank] connection" where the [blank] indicates a person or institution likely to give rise to a sense of trust in the recipient. In another social networking environment, trusted members can be requested to "endorse" another member so as to bolster a level of trust in the member to be accorded by unknown other members.

BRIEF SUMMARY OF THE INVENTION

Embodiments of the present invention address deficiencies of the art in respect to e-mail management and provide a novel and non-obvious method, system and computer program product for e-mail message endorsement in an e-mail management system. In an embodiment of the invention, a method for e-mail message endorsement in an e-mail management system can be provided. The method can include comparing a sender and a recipient of an e-mail message in a social network to identify linking relationships between the sender and the recipient, and visually distinguishing the e-mail message based upon identified linking relationships. In one aspect of the embodiment, the method further can include repeating the comparing to identify new linking relationships, and updating the visual distinction of the e-mail message to account for the identified new linking relationships.

In another aspect of the embodiment, the method also can include noticing the linking relationships of the e-mail message, receiving endorsements from individual ones of the linking relationships, determining whether or not a threshold number of linking relationships have endorsed the e-mail message, and releasing the e-mail message for viewing by the recipient only when a threshold number of linking relationships have endorsed the e-mail message. For instance, determining whether or not a threshold number of linking relationships have endorsed the e-mail message can include determining whether or not a threshold number of linking relationships at a higher level in the social network than the sender have endorsed the e-mail message.

In yet another aspect of the embodiment, visually distinguishing the e-mail message can include highlighting the e-mail message in an inbox of the recipient to indicate an endorsement. In even yet another aspect of the embodiment, visually distinguishing the e-mail message can include listing in a view to the e-mail message the identified names of the linking relationships. Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for e-mail endorsement through social network verification;

FIG. 2 is a schematic illustration of an e-mail management data processing system configured for e-mail endorsement through social network verification; and, FIG. 3 is a flow chart illustrating a process for e-mail endorsement through social network verification.

DETAILED DESCRIPTION OF THE INVENTION

Embodiments of the present invention provide a method, system and computer program product for e-mail endorsement through social network verification. In accordance with an embodiment of the present invention, the sender of an e-mail message can be compared to the recipient in a social network hierarchy to determine relationships linking the sender and the receiver. If relationships can be identified within the social network, an indication of the linking relationships can be applied to the e-mail and visually distinguished within an inbox view of e-mail messages for the recipient. In this way, the visually distinguished e-mail messages can be recognized by the recipient as e-mail messages that have been endorsed by trusted parties.

In further illustration, FIG. 1 pictorial depicts a process for e-mail endorsement through social network verification. As shown in FIG. 1, an e-mail message 120 can be compared to a social network 130 in which different users 150 are related to other users 150 through linking inter-relationships. To that end, any one of the users 150 in the social network 130 can be expressed in respect to another of the users 150 in the social network 130 according to those of the users 150 residing in a connecting path. Further, any one of the users 150 in the social network 130 can be expressed in respect to another of the users 150 in the social network 130 according to a number of those of the users 150 residing in a connecting path.

An endorsement 140 can be applied to the e-mail message 120. The endorsement 140 can be based upon the linking relationships between the sender of the e-mail message 120 and the recipient of the e-mail message 120. In this regard, the endorsement 140 can indicate a listing of the linking relationships connecting the sender of the e-mail message 120 and the recipient of the e-mail message 120. Further, the endorsement 140 can indicate whether or not a given one of the linking relationships has reviewed the attempt to transmit the e-mail message 120 by the sender and expressly endorsed the sender.

In this regard, the endorsement 140 can dynamically change as different ones of the linking relationships affirmatively endorse the sender. Thereafter, the e-mail message 120 can be visually distinguished in an e-mail client 110 according to the endorsement 140. For example, a visually distinguishing icon can be placed adjacent to the e-mail message 120, or the e-mail message 120 can be highlighted in a different color or typeface. Yet further, the e-mail message 120 can provide a listing of the linking relationships in a view to the e-mail message 120.

The process shown in FIG. 1 can be implemented in an e-mail management system. In illustration, FIG. 2 schematically shows an e-mail management data processing system configured for e-mail endorsement through social network verification. The system can include host servers 210A, 210B hosting a social networking system 220A managing a corresponding social network 220B of users, and an e-mail server 230, respectively. The host servers 210A, 210B can be configured for communicative coupling to client computing devices 240 over computer communications network 250. Each of the client computing devices 240 can support the operation of a corresponding e-mail client 260, each e-mail client 260 providing an e-mail inbox 270 in which an end user can view received e-mail messages.

It is to be recognized by the skilled artisan that while two separate host servers 210A, 210B are shown supporting the operation of the social networking system 220A and the e-mail server 230, the invention is not so limited and a single computing platform can support the operation of both the social networking system 220A and the e-mail server 230. Alternatively, multiple different computing platforms can support the operation of both the social networking system 220A and the e-mail server 230. Yet further, the e-mail client 260 for each of the client computing devices 240 can be a heavy client, or a lightweight Web based client distributed by the e-mail server 230 over the computer communications network 250.

Notably, social network endorsement logic 280 can be coupled to each of the e-mail clients 260, the e-mail server 230, or both. The social network endorsement logic 280 can include program code enabled to compare a sender and a recipient of an e-mail message managed by the e-mail server 230 with the social network 220B in order to identify linking relationships between the sender and the recipient. The program code can be further enabled to visually distinguish the e-mail message in a corresponding inbox 270 when one or more linking relationships between the sender and the recipient can be identified as an automated endorsement of the e-mail message.

For instance, a listing of the linking relationships can be provided in connection with the e-mail message, or the appearance of the e-mail message in the inbox 270 can be highlighted to indicate an endorsement based upon the linking relationships. In one aspect of the invention, the endorsement of the e-mail message can be a continuous process even after the e-mail message has been viewed and moved to a folder other than the inbox 270. Further, as new linking relationships are uncovered due to the activity of the sender and the recipient in the social network 220B, those new linking relationships can be reflected in the e-mail message.

In even yet further illustration of the operation of the social network endorsement logic 280, FIG. 3 is a flow chart illustrating a process for e-mail endorsement through social network verification. Beginning in block 310, an e-mail message received by a recipient can be retrieved for processing and in block 320 a sender of the message can be identified. In block 330, a social network can be queried in respect to the sender and the linking relationships between the sender and the recipient in the social network can be identified and provided by name in connection with the e-mail message.

In block 340, notice can be sent to each linking relationship between the sender and the recipient to request an endorsement of the sender. To the extent that multiple different paths of linking relationships subsist between the sender and the recipient, the notice can be provided to all paths, or to selected paths depending upon pre-established path selection rules. In response to receiving an endorsement notice, a linking relationship can vouch for the identity of the sender. Optionally, the linking relationship can inspect the content of the e-mail message before providing an endorsement.

In decision block 350 if an endorsement is provided by a linking relationship, in block 360 the endorsement can be applied to the e-mail message. Thereafter, in decision block 370, if enough linking relationships have endorsed the e-mail message, the e-mail message can be forwarded to the recipient in block 380. In this regard, the threshold can range from no endorsements to several. The threshold also can require a particular linking relationship to provide an endorsement such as a higher ranking individual than the sender in an organization hierarchy reflected by the social network. In any event, once released, the e-mail message can reflect not only the sender and the recipient in a view to the message, but also a listing of those linking relationships that have endorsed the e-mail message. Notably, the view to the e-mail message can change dynamically as different linking relationships provide an endorsement for the e-mail message.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for e-mail message endorsement in an e-mail management system, the method comprising:
   comparing a sender and a recipient of an e-mail message to identify linking relationships between the sender and the recipient by issuing over a computer communications network, a query of a social network in respect to the sender and the linking relationships between the sender and the recipient in the social network,
   sending over the computer communications network an endorsement notice to each end user of social network corresponding to a linking relationship between the sender and the recipient in order to request an endorsement of the sender by each end user;
   receiving from over the computer communications networks at least one endorsement from a corresponding end user of the social network in response to the endorsement notice;
   applying the at least one endorsement to the e-mail message; and,
   visually distinguishing the e-mail message in the e-mail client based upon the applied endorsement.

2. The method of claim 1, further comprising:
   repeating the comparing to identify new linking relationships;
   updating the visual distinction of the e-mail message to account for identified new linking relationships.

3. The method of claim 1, further comprising:
   determining whether or not a threshold number of linking relationships have been received for the e-mail message; and,
   releasing the e-mail message for viewing by the recipient only when a threshold number of end users of the social network corresponding to the linking relationships have provided endorsements.

4. The method of claim 3, wherein determining whether or not a threshold number of linking relationships have been received for the e-mail message comprises determining whether or not a threshold number of end users of the social network corresponding to linking relationships at a higher level in the social network than the sender have provided endorsements.

5. The method of claim 1, wherein visually distinguishing the e-mail message in the e-mail client based upon the applied endorsement, comprises listing names of the linking relationships in connection with the e-mail message.

6. The method of claim 1, wherein visually distinguishing the e-mail message in the e-mail client based upon the applied endorsement, comprises highlighting the e-mail message in an inbox of the recipient to indicate an endorsement.

7. The method of claim 5, wherein visually distinguishing the e-mail message in the e-mail client based upon the applied endorsement, comprises listing in a view to the e-mail message the identified names of the linking relationships.

8. An e-mail management data processing system comprising:
   an e-mail server executing in a host computing platform and communicatively coupled to a social networking system over a computer communications network; and,
   social network endorsement logic coupled to the e-mail server, the logic comprising program code enabled to compare a sender and a recipient of an e-mail message to identify linking relationships between the sender and the recipient by issuing over a computer communications network, a query of a social network in respect to the sender and the linking relationships between the sender and the recipient in the social network, to send over the computer communications network an endorsement notice to each end user of social network corresponding to a linking relationship between the sender and the recipient in order to request an endorsement of the sender by each end user, to receive from over the computer communications networks at least one endorsement from a corresponding end user of the social network in response to the endorsement notice, to apply the at least one endorsement to the e-mail message, and to visually distinguish the e-mail message in the e-mail server based upon the applied endorsement.

9. A computer program product comprising a computer usable storage memory device storing computer usable program code for e-mail message endorsement in an e-mail management system, the computer program product comprising:

computer usable program code for comparing a sender and a recipient of an e-mail message to identify linking relationships between the sender and the recipient by issuing over a computer communications network, a query of a social network in respect to the sender and the linking relationships between the sender and the recipient in the social network;

computer usable program code for sending over the computer communications network an endorsement notice to each end user of social network corresponding to a linking relationship between the sender and the recipient in order to request an endorsement of the sender by each end user;

computer usable program code for receiving from over the computer communications networks at least one endorsement from a corresponding end user of the social network in response to the endorsement notice;

computer usable program code for applying the at least one endorsement to the e-mail message; and, computer usable program code for visually distinguishing the e-mail message in the e-mail client based upon the applied endorsement.

10. The computer program product of claim 9, further comprising:

computer usable program code for repeating the comparing to identify new linking relationships; and, computer usable program code for updating the visual distinction of the e-mail message to account for identified new linking relationships.

11. The computer program product of claim 9, further comprising:

computer usable program code for determining whether or not a threshold number of linking relationships have been received for the e-mail message; and, computer usable program code for releasing the e-mail message for viewing by the recipient only when a threshold number of end users of the social network corresponding to the linking relationships have provided endorsements.

12. The computer program product of claim 11, wherein the computer usable program code for wherein determining whether or not a threshold number of linking relationships have been received for the e-mail message comprises computer usable program code for determining whether or not a threshold number of end users of the social network corresponding to linking relationships at a higher level in the social network than the sender have provided endorsements.

13. The computer program product of claim 9, wherein the computer usable program code for visually distinguishing the e-mail message in the e-mail client based upon the applied identified endorsement, comprises computer usable program code for listing names of the linking relationships in connection with the e-mail message.

14. The computer program product of claim 9, wherein the computer usable program code for visually distinguishing the e-mail message in the e-mail client based upon the applied endorsement, comprises computer usable program code for highlighting the e-mail message in an inbox of the recipient to indicate an endorsement.

15. The computer program product of claim 13, wherein the computer usable program code for visually distinguishing the e-mail message in the e-mail client based upon the applied endorsement, comprises computer usable program code for listing in a view to the e-mail message the identified names of the linking relationships.

* * * * *